March 2, 1971 M. W. PERGA 3,567,403
EXHAUST GAS CATALYTIC CONVERTER
Filed Jan. 29, 1969
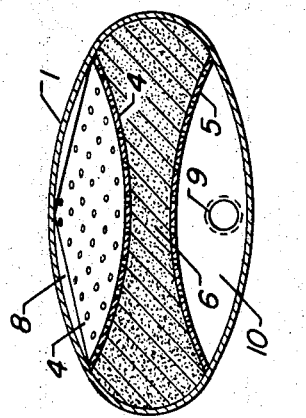
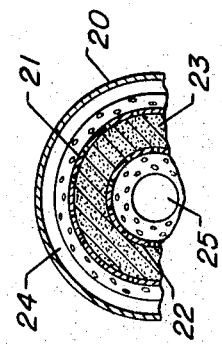
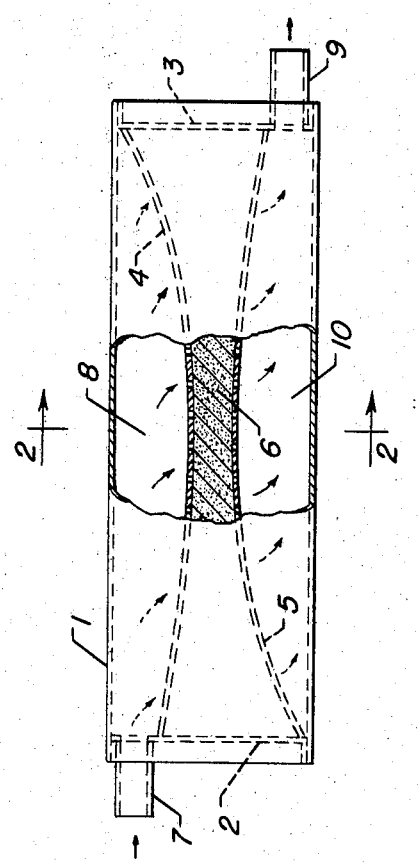
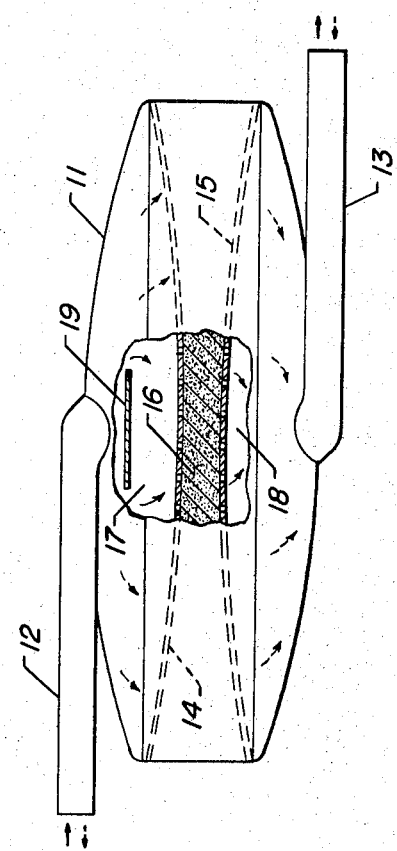
INVENTOR:
Martin W. Perga
BY *James R. Hoolson, Jr.*
*Philip T. Liggett*
ATTORNEYS United States Patent Office 3,567,403
Patented Mar. 2, 1971

3,567,403
EXHAUST GAS CATALYTIC CONVERTER
Martin W. Perga, Hoffman Estates, Ill., assignor to Universal Oil Products Company, Des Plaines, Ill.
Filed Jan. 29, 1969, Ser. No. 795,122
Int. Cl. B01j 9/04
U.S. Cl. 23—288                                                  4 Claims

ABSTRACT OF THE DISCLOSURE

In a catalytic converter unit having a fixed bed of catalyst particles, the improved construction which uses a pair of opposing perforated members to support the catalyst therebetween and each of the perforated members is of a dished design that is positioned to be convex inwardly toward the catalyst such that particles will be held in a tight non-settling manner when the unit is subjected to expansion from high temperature operating conditions.

---

The present invention relates to an improved form of exhaust gas converter design which overcomes catalyst particle settling and thus tends to maintain a tightly packed particle bed. More specifically, the invention is directed to a converter design which maintains a fixed bed of catalyst and has the catalyst support screens bowed inwardly toward the bed so that temperature expansion will be in a known controlled direction and, at the same time, will keep the catalyst particles in a substantially compact bed.

The typical or conventional designs for catalytic converter units which may be used for the treatment of automobile exhaust gases have utilized screens or perforated plates to retain catalyst pills, beads, etc. in an internal fixed bed through which the exhaust gas stream can pass and be treated. However, the usual designs, with flat or annular beds of catalyst, have the support screens or plates arranged in a manner that will permit enlargement of the catalyst zone from expansions due to temperature, or are such that there can be undesirable buckling and subsequent failure. The innumerable heating and cooling phases to which a converter is subjected in connection with automotive exhaust gas treating can also lead to catalyst settling and by-passing, particularly where the support screen can buckle or expand outwardly away from the retained catalyst bed.

It is thus an object of the present invention to provide a converter unit with an internally designed catalyst retaining section which will function under high temperature operating conditions in a manner to hold the catalyst in a non-settling bed.

It may be considered a further object of the invention to provide perforated retainer plates or screens for the catalyst bed which are dished inwardly toward the bed itself so that the screen expansion is controlled to preclude buckling and, at the same time, will hold the catalyst in a tight, packed-bed manner.

In a broad aspect, the present invention provides an improved catalytic converter of the type having a fixed or stationary bed of catalyst particles in a confined chamber and the gas inlet and gas outlet means thereto are arranged such that the aforesaid gas stream to be treated will pass through the catalyst bed, with the improvement in construction and arrangement comprising, supporting the catalyst particles between a set of opposing perforated members that each have a dished shape and are each positioned within the chamber to be curved inwardly toward the retained bed of particles, whereby the particles will be held tightly in a non-settling manner when the unit is in operation and is subjected to expansion from high temperature conditions.

It is not intended to limit the catalytic converter unit to any one general shape or cross section inasmuch as it may be of a generally elongated rectangular form or, alternatively, may be of an elongated tubular form with a cylindrical or oval cross section. In still another embodiment, the converter unit may be of a generally round or disc-like shape with means being provided to pass the exhaust gas stream upwardly or downwardly through a central catalyst section.

The use of the bowed screens or dish-shaped perforate plate means is more generally adaptable to retaining a substantially flat thin bed of catalyst particles which will be retained within the center portion of the converter unit in a manner to have the gas stream to be treated pass therethrough from one side to the other. On the other hand, it is contemplated within the scope of the present invention that inner and outer screens or perforated plate members may be of a cylindrical form, or oval form, with one screen member being placed substantially concentrically within the other and provide for maintaining an annular form bed of catalyst particles between screens. In this instance, the inner screen member is bowed outwardly or in a direction toward the catalyst particles, while the outer screen members is bowed inwardly, also in a direction toward the catalyst particles. Thus, in all instances, it is required that the curvature or bowing of the particle retaining members be in a direction which is toward the catalyst such that when the converter unit is subjected to high temperature conditions there will be partitioning expansion in a known direction and toward the catalyst bed. Where each of the opposing perforated members are positioned to expand toward one another, there is a squeezing or expansion inwardly with respect to the retained catalyst particles and the latter are maintained in a non-settling substantially tight contact bed during operating periods.

The screens or plate members are generally subjected to high temperature conditions, in a range which may be from approximately 600° F. to 1400° F., or more, by reason of the catalytic oxidation conditions and it is, therefore, necessary that the members be made of stainless steels or alloys which are temperature resistant and can accommodate expansion and contraction conditions over long periods of operation. The catalyst support members will also be provided of a screen mesh, or of perforated plate material, having perforations that are sized to preclude the loss of catalyst particles through the openings. Generally, the catalyst particles will be in a size range of from about 1/16″ to about 1/4″.

It is not intended to limit the present invention to the use of any one type of catalyst material inasmuch as suitable oxidation catalysts may include the metals of Groups I, V, VI and VIII of the Periodic Table, with copper, silver, vanadium, chromium, iron, cobalt, nickel, platinum and palladium being components of particular value. The components may be used singly or in combination where two or more active components are utilized on the support material. Generally, the support will be in the nature of pellets or spheres and will comprise alumina, silica-alumina, alumina with barium, calcium or other additive material such as zirconium, thoria, boria and the like.

Where the converter is to be utilized as a "catalytic muffler" for use with vehicle exhaust gases, then the unit may be placed in the exhaust line in the manner of a conventional automobile converter or, alternatively, it may be positioned more closely adjacent the engine and directly attachable to the exhaust gas manifold.

The modified design and construction of the present improved converter, as well as advantageous features in connection therewith, may be better set forth and explained by reference to the accompanying diagrammatic drawing and the following description thereof.

FIG. 1 of the drawing is an elevational view partially in section, indicating an elongated oval form of converter unit.

FIG. 2 is a sectional elevational view through the converter unit of FIG. 1, as indicated by the line 2—2 therein.

FIG. 3 indicates diagrammatically in an elevational view, partially in section, a modified form of converter unit which is of a substantially disc-like configuration having upper and lower gas inlet and gas outlet means.

FIG. 4 shows, in a partial sectional view, how concentric catalyst support members may be arranged to have each support bow inwardly toward the annular-form catalyst bed.

Referring now to FIGS. 1 and 2 of the drawing, there is indicated an elongated housing or chamber 1 having end closure plate means 2 and 3. Positioned transversely across the interior of the chamber 1, and spaced apart from one another, are the respective upper and lower catalyst support members 4 and 5. These support members may be of screen or of perforate plate and each has a multiplicity of holes or slots which in turn are sized to retain the catalyst particles being maintained within an interior bed 6. In the present embodiment, a gas inlet 7 is shown communicating with a gas distribution manifold section 8, provided between the perforate member 4 and the chamber wall 1, while at the other end of the converter unit there is provided a gas outlet port means 9 opening into and communicating with a treated gas collection section 10 that is provided between the exterior face of catalyst support screen 5 and the inner wall of chamber 1. Thus, the exhaust gas stream flow to be treated will enter the converter chamber 1 and be distributed through the perforations of plate member 4 into catalyst bed 6 and then pass through the perforate plate member 5 into treated gas section 10 for discharge by way of outlet 9.

In accordance with the present invention, it is to be noted that the two catalyst retaining plates 4 and 5 are curved or dished inwardly toward one another and toward the catalyst bed 6 in both the longitudinal and the transverse directions (as best shown by FIG. 2). Thus, with high temperature operating conditions and the accompanying metal expansion problem, there will be an expansion of the plate members in a controlled inward direction with respect to the catalyst bed 6 and the resulting retention of particles within such bed in a tight non-settling manner.

Generally, the dishing of the plate members 4 and 5 will only be that necessary to effect a controlled expansion of the metal during the heating up periods when in operation. In other words, by minimizing the dishing or curvature of the plates there will be a substantially uniform thickness for the catalyst particles in bed 6 and a resulting substantially uniform treatment of the gas flow as it passes through the catalyst bed from inlet manifold section to the outlet manifold section.

Where desired, the inlet and outlet sections may be tapered or have varying cross-sectional areas so as to provide improved flow characteristics through the catalyst bed by compensating for the "velocity head" of the gas stream. In other words, the inlet manifold will preferably decrease in cross-sectional area from the upstream portion thereof to the downstream end, while conversely the outlet manifold section, such as section 10, will increase in cross-sectional area from the upstream end portion to the outlet end where it discharges into the outlet port 9.

Referring now particularly to FIG. 3 of the drawing, there is indicated a chamber or housing 11 having an inlet pipe section 12 and outlet pipe section 13. The interior of the chamber 11 is provided with opposing, spaced apart catalyst retaining plates 14 and 15 each of which are provided with a multiplicity of holes or slots sized to retain an internal catalyst bed 16 that extends across the entire lateral cross section of the chamber 11. Thus in operation, an exhaust gas stream will pass downwardly from the inlet pipe 12 into a manifold section 17 to be distributed through the transverse catalyst bed 16 and thence downwardly into a treated gas collection section 18 where it is discharged by way of outlet pipe 13. It should also be noted, in accordance with the present invention, that plates 14 and 15 are each dished or curved inwardly toward the retained catalyst 16 such that, in each case, the perforate plate or screen members will have a controlled direction of expansion during heating up conditions and during such time as the converter is in operation effecting the catalytic conversion of the waste gas stream. As noted hereinbefore, the catalytic oxidation of combustible components in the exhaust gas stream can effect high operating temperature which may be of the order of 1400° F. Actually, with an active catalytic component for the catalyst particles in bed 16 there may be catalytic oxidation initated at low temperature of the order of 400° F. so that the entire catalyst bed gradually becomes quite hot and the heat therefrom will then be conducted to the supporting screens 14 and 15.

Various types of baffling may be provided in the manifold section in order to uniformly channel and distribute the gas stream flow throughout the entire catalyst section so as to obtain optimum conversion results therefrom and it is not intended to limit the present converter design to any one shape or to the use of any one type of baffling to control stream flow. For illustrative purposes, a lateral baffle plate 19 is shown spaced across the outlet of the pipe section 12 which communicates with the distributing manifold section 17 in order to preclude a direct exhaust gas stream flow through the center portion of the bed 16. The baffling 19 may be supported from the chamber wall by suitable strut means or, alternatively, it may be supported from spacer means from the transverse perforate plate means 14. Still further, there may be various types of baffling members placed within the catalyst bed 16 and between plate means 14 and 15, as long as such members do not interfere with the normal bowing or expanded curvature for such plates.

In FIG. 4 of the drawing, there is shown a cylindrical form of casing 20 with concentrically positioned and bowed catalyst retaining members 21 and 22 providing an annular form of catalyst section 23. The outer perforated member 23 is spaced inwardly from the casing 20 in order to provide an outer gas manifold section 24, while the interior of tubular member 22 provides an inner manifold section. Gas inlet and outlet port means may be provided to the manifold sections through the casing 20, but are not shown in the present drawing. Actually, gas flow to the converter can be radially inward through bed 23 or radially outward therethrough. In either case the tubes or numbers 21 and 22 will not be of a uniform diameter but shall each be constructed to bow toward the catalyst bed. Thus, the catalyst bed will be retained in a tightly packed manner and the tubular screen members will have controlled expansion in a known direction.

For illustrative purposes, the present embodiments have been shown in a simplified manner, however, where desired still further external designs or configurations may be utilized and should be obvious to those skilled in the converter-muffler arts. Also, where it is deemed desirable for operating characteristics, insulation may be provided around the chamber in order to retain heat within the interior of the converter unit and enhance the oxidation reactions to be carried out therein. In still other instances, it may be desirable to have a weather proof casing around the insulation which in turn surrounds the actual converter chamber.

I claim as my invention:

1. In a catalytic converter unit having a stationary bed of catalyst particles in a confined chamber and gas inlet and outlet means thereto that are arranged to pass the exhaust gas stream to be treated through the catalyst bed, the improved construction and arrangement which comprises, supporting the catalyst particles between a set of opposing perforated members that each have a dished shape and are each positioned in the chamber to be curved inwardly toward the retained bed of particles, whereby such particles are held tightly in a non-settling manner when the unit is subjected to expansion from high temperature conditions.

2. The converter unit of claim 1 further characterized in that the perforated members extend transversely across the interior of an elongated form converter chamber so as to provide a substantially flat retained bed of particles.

3. The converter unit of claim 1 further characterized in that said confined chamber is of a generally circular shape and the spaced apart opposing perforate members with the curved dish shaped configuration retain a substantially disc-shaped bed of particles.

4. The converter unit of claim 1 further characterized in that said opposing perforate members are concentric with one another and are curved toward one another to provide an annular-form retained bed of catalyst particles therebetween.

References Cited
UNITED STATES PATENTS

| | | | |
|---|---|---|---|
| 3,024,593 | 3/1962 | Houdry | 23—288.3FUX |
| 3,041,149 | 6/1962 | Houdry | 23—288.3F |
| 3,149,925 | 9/1964 | Scheitlin | 23—288.3F |
| 3,154,388 | 10/1964 | Purse | 23—288.3F |
| 3,223,491 | 12/1965 | Maillie et al. | 23—288.3F |

JOSEPH SCOVRONEK, Primary Examiner